United States Patent
McCusker et al.

(10) Patent No.: US 11,156,461 B1
(45) Date of Patent: Oct. 26, 2021

(54) SYSTEM AND METHOD FOR OPTIMIZING HOLD AND DIVERT OPERATIONS

(71) Applicant: ROCKWELL COLLINS, INC., Cedar Rapids, IA (US)

(72) Inventors: Patrick D. McCusker, Walker, IA (US); Sarah Barber, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 216 days.

(21) Appl. No.: 16/400,968

(22) Filed: May 1, 2019

Related U.S. Application Data (63) Continuation of application No. 14/596,342, filed on Jan. 14, 2015, now abandoned.

(51) Int. Cl.
*G01C 21/20* (2006.01)

(52) U.S. Cl.
CPC .................. *G01C 21/20* (2013.01)

(58) Field of Classification Search
CPC ...................................................... G01C 21/20
See application file for complete search history.

(56) References Cited

U.S. PATENT DOCUMENTS

| | | | | |
|---|---|---|---|---|
| 2008/0300737 A1* | 12/2008 | Sacle | .................. | G08G 5/0039 701/3 |
| 2010/0023187 A1* | 1/2010 | Gannon | .................. | G01C 23/00 701/7 |
| 2011/0264312 A1* | 10/2011 | Spinelli | ............... | G08G 5/0021 701/16 |
| 2013/0179059 A1* | 7/2013 | Otto | ....................... | G06Q 50/30 701/120 |

OTHER PUBLICATIONS

Non-Final Office Action on U.S. Appl. No. 14/596,342, dated Mar. 24, 2016, 9 pages.
Final Office Action for U.S. Appl. No. 14/596,342 dated Sep. 30, 2016. 10 pages.

* cited by examiner

*Primary Examiner* — Imran K Mustafa
(74) *Attorney, Agent, or Firm* — Suiter Swantz pc llo (57) ABSTRACT

Systems and methods for providing decision support guidance are provided. A method includes receiving airport information that includes a location of each airport of a plurality of airports. The method further includes determining a flight range of an ownship based on a location of the ownship and an amount of fuel remaining in the ownship, and determining if any airport of the plurality of airports is within the flight range of the ownship. The method further includes, for each airport within the flight range: determining an amount of time the ownship can maintain a current flight course before the airport is no longer within the flight range; and providing display data. The display data indicates the amount of time the ownship can maintain the current flight course before the airport is no longer within the flight range.

19 Claims, 8 Drawing Sheets

SYSTEM AND METHOD FOR OPTIMIZING HOLD AND DIVERT OPERATIONS

CROSS-REFERENCE TO RELATED APPLICATIONS

The present application is a continuation of, claims the benefit of and priority to U.S. patent application Ser. No. 14/596,342, titled "SYSTEM AND METHOD FOR OPTIMIZING HOLD AND DIVERT OPERATIONS," filed Jan. 14, 2015, the disclosure of which is incorporated herein by reference in its entirety.

BACKGROUND

The present disclosure relates generally to the field of navigation systems, including navigation display systems that provide decision support guidance or other assistance to pilots. More particularly, the present invention relates to systems and methods configured to ensure that an aircraft can reach an alternate airport in cases where landing at the intended airport is no longer viable, for example, when landing at the intended airport is impossible or the difficulty of landing at the intended airport is unadvised, would be dangerous or otherwise unsafe due to weather conditions, air traffic congestion, natural disaster, or airport closure, among other reasons.

Displays are utilized in a wide variety of applications including but not limited to medical, military, avionic, entertainment and computing applications. In one exemplary application, displays are used in avionics to provide operators of vehicles, such as pilots or navigators, of information relating to weather and other aviation events. In some aircraft applications, instead of or in addition to analog dials and gauges, display screens provide the pilot with information about the situation of the aircraft, such as altitude, speed, directional headings, remaining fuel, and so on. Displays may also provide the pilot with navigation information, such as weather, no-fly zones, directions to hold for landing clearance, directions to divert to an alternative airport, or other aviation events, as well as communication data between other aircraft, airports, or other ground-based systems.

Air traffic control ("ATC") is a service provided by ground-based controllers that direct aircraft that fly through controlled airspace. The level of control provided by ATC may vary based on the class of airspace. For example, the United States divides its airspace into seven classes, ranging from Class A to Class G. The classes may be based on altitude (e.g., above 18,000 feet), location (e.g., near airports or major cities), air traffic level, etc. One of the primary purposes for ATC services are to provide safer travel by preventing collisions, more efficient or faster travel by expediting the flow of traffic, and to provide other information and support to pilots. When such situations arise (e.g., due to increased traffic, weather, natural disaster, etc.) ATC services may provide directions to aircraft to assist in rerouting a flight course, set priorities for landing, and so on.

In some cases, ATC may direct aircraft to maintain a certain flight course or to enter a holding pattern. For example, upon a severe storm or otherwise dangerous weather forming over an airport, ATC may direct aircraft to hold over a specific location until the aircraft may safely land. In such cases, ATC may issue a holding pattern to follow, or the pilot may be required to know the holding pattern for a particular location or airport. Typical holding patterns may be in the shape of an oval or other circular pattern using right-hand turns and taking a predetermined amount of time to complete. Once a hold has been lifted (e.g., due to weather conditions improving, a particular aircraft being next in line to land, etc.), ATC prioritizes the landing order of aircraft remaining in the hold pattern.

While ATC services may typically provide timely and safe courses of actions for pilots to take, the benefits of ATC services may be limited in several ways. First, air traffic controllers may not be aware of all data relevant to how long a particular aircraft may maintain a holding pattern. For example, in some cases, particular aircraft may have to orally communicate their remaining fuel supply and estimate their maximum holding times to air traffic controllers. Second, air traffic controllers are subject to human error and may make mistakes in determining holding patterns, holding times, or landing priority. Further, in some cases, certain locations or airports may not provide ATC services, thereby requiring pilots to determine maximum holding times while simultaneously piloting an aircraft, in some cases, during dangerous weather or other emergency situations. Accordingly, a pilot operating without the support of a dispatcher at a ground center may struggle with the work load that occurs when deteriorating weather causes delays or closures at the destination airport. For example, if the weather deteriorates at a destination airport while an aircraft is en route, ATC may issue a "Hold and Expect Further Clearance" directive to the flight crew. The crew must then make a sequence of complicated decisions in deciding whether to hold at the intended point or to divert to an alternate airport. Such a decision typically depends on a variety of factors, such the fuel remaining on the aircraft, the optimum airspeed for the aircraft to produce maximum endurance and/or maximum range given the remaining fuel, the location of all possible alternate airports, and the weather forecast at each of those alternate airports. In addition, once a hold has been issued (e.g., due to weather concerns), the pilot must determine when it is no longer possible to hold at the instructed location and when to divert to an alternate airport. Such determinations can become very complex if there are multiple alternate airports to choose from, if the ownship fuel supply is running low and alternate airports may become out of range if the ownship continues to hold at a certain location, if some or all alternate airports are also experiencing dangerous weather, if a route to an alternate airport is affected by dangerous whether, and so on.

A pilot or flight crew is ultimately tasked with making a decision to hold or to divert to an alternate airport. In some cases, the aircraft may only have sufficient fuel to hold for twenty-five minutes at the instructed location before being required to land, while the same amount of fuel may also be sufficient to hold for fifteen minutes before diverting to an alternate nearby airport. Yet, if the alternate airport is experiencing bad weather, changing conditions could eliminate the alternate airport as an option for a diversion, thereby forcing the aircraft to divert to a more distant alternate airport, thus reducing the fuel and time available for holding at the current location (i.e., the pilot has to make a decision to divert to the more distant airport sooner). However, if the ownship remains in a hold long enough, the more distant alternate airport could also be eliminated as an option for a diversion (e.g., due to decreased fuel supplies, changing weather, etc.). As a result, the crew must be very cautious in making such determinations to ensure that the aircraft can always reach an alternate airport where local weather conditions will permit the safe landing of the aircraft.

Current systems require that the crew rely on charts and maps as well as a variety of onboard manuals to determine optimum speeds, ownship range, routes to alternate airports, fuel consumption required to reach those alternate airports, and so on, in making a determination to either hold a current route or to divert. Current flight management systems have limited capabilities and typically only provide estimated fuel consumption requirements needed in order to reach the intended destination in the active flight plan. Therefore, estimating the time, distance, fuel requirements, optimum speeds, and most efficient and safest route to alternate airports is largely determined by the flight crew on their own without the assistance of a guidance system (e.g., using a pen and paper, etc.). In addition, pilots typically only have access to current and forecasted weather information for the current location of the ownship or along the active flight plan. Therefore, current and predicted weather information for alternate airports is typically received over voice channels from ATC services, which is prone to reporting errors or miscommunications.

Current hold-or-divert systems typically provide limited information that often require the aircraft crew to form mental images of actual events (e.g., weather, air traffic, or other aviation events) or to carry out complex calculations while simultaneously piloting an aircraft. There is an ongoing need for improved decision support guidance systems and methods that display options to aircraft crew when faced with dangerous weather or when issued a "hold" directive from ATC services. There is yet further need for improved decision support guidance display systems and methods that display information for making determination to either maintain a hold pattern or to divert to an alternate airport.

SUMMARY OF THE INVENTION

One embodiment of the present disclosure relates to a method that includes receiving airport information for a plurality of airports. The airport information includes a location of each airport of the plurality of airports. The method further includes determining a flight range of an ownship based on a location of the ownship and an amount of fuel remaining in the ownship, and determining if any airport of the plurality of airports is within the flight range of the ownship. The method further includes, for each airport within the flight range of the ownship, determining an amount of time the ownship can maintain a current flight course before the airport is no longer within the flight range; and providing display data. The display data indicates the amount of time the ownship can maintain the current flight course before the airport is no longer within the flight range.

Another embodiment of the present disclosure relates to a system for providing decision support guidance that includes a processor, a display, and a processing circuit. The processing circuit is configured to receive airport information for a plurality of airports. The airport information includes a location of each airport of the plurality of airports. The processing circuit is further configured to determine a flight range of an ownship based on a location of the ownship and an amount of fuel remaining in the ownship, and determine if any airport of the plurality of airports is within the flight range of the ownship. The processor is further configured to, for each airport within the flight range of the ownship, determine an amount of time the ownship can maintain a current flight course before the airport is no longer within the flight range; and provide display data. The display data indicates the amount of time the ownship can maintain the current flight course before the airport is no longer within the flight range.

Another embodiment of the present disclosure relates to a method of providing decision support guidance. The method includes receiving ownship information and airport information for a plurality of airports. The ownship information includes an ownship location, a current flight course, and an amount of fuel remaining in the ownship. The current flight course comprises a holding pattern. The plurality of airports include a primary airport and at least one alternate airport. The airport information includes a location of each airport of the plurality of airports. The method also includes determining a flight range of the ownship based on the amount of fuel remaining in the ownship, and determining if any airport of the plurality of airports is within the flight range of the ownship. The method also includes determining, for each airport within the flight range, an amount of time the ownship can maintain the current flight course before the airport is no longer within the flight range; and providing, for each airport within the flight range, display data. The display data indicates the amount of time the ownship can maintain the current flight course before the airport is no longer within the flight range.

BRIEF DESCRIPTION OF THE DRAWINGS

The disclosure will become more fully understood from the following detailed description, taken in conjunction with the accompanying drawings, wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting. As discussed below, the systems and methods can be utilized in a number of display devices for various types of applications or sensing systems. In some embodiments, the systems and methods of the present disclosure may be used for a flight display of an aircraft. According to various other exemplary embodiments, the systems and methods of the present disclosure may be used by any system in any other embodiment for rendering computer graphics and displaying an output (e.g., in another aircraft or spacecraft, a ground-based vehicle, or in a non-vehicle application such as a ground-based display system, air traffic control system, or radar system).

Figure 1A:
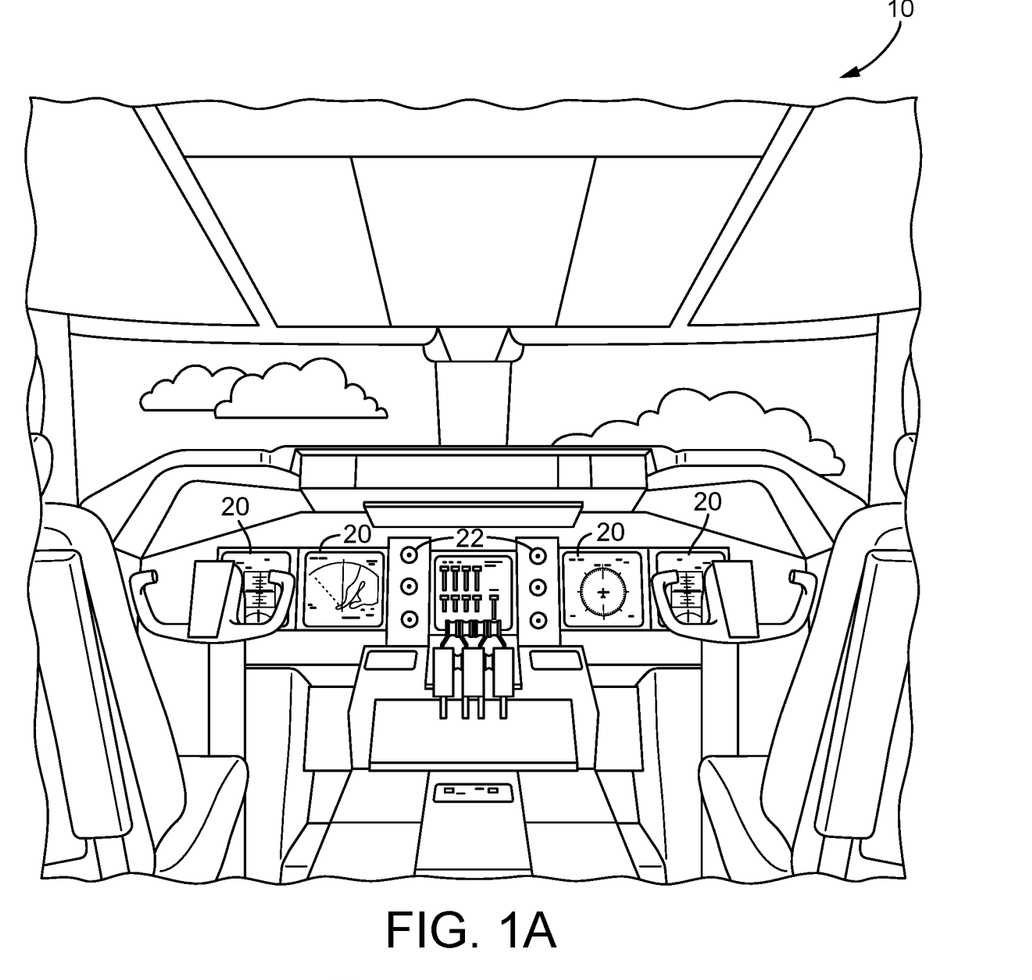
FIG. 1A is a perspective view schematic of an exemplary aircraft control center or cockpit.

Referring to FIG. 1A, a perspective view schematic of an exemplary aircraft control center or cockpit 10 for an aircraft is shown. Aircraft control center 10 may include one or more flight displays 20. Flight displays 20 may be implemented using any of a variety of display technologies, including CRT, LCD, organic LED, dot matrix display, and others. Flight displays 20 may be navigation (NAV) displays, primary flight displays, electronic flight bag displays, tablets such as iPadx computers manufactured by Apple, Inc. or tablet computers, synthetic vision system displays, head up displays (HUDs) with or without a projector, wearable displays, Google glasses, etc. Flight displays 20 may be used to provide information to the flight crew, thereby increasing visual range (e.g., by displaying information received from long-range radar systems, etc.) and enhancing decision-making abilities. One or more flight displays 20 may be configured to function as, for example, a primary flight display (PFD) used to display altitude, airspeed, vertical speed, and navigation and traffic collision avoidance system (TCAS) advisories. One or more flight displays 20 may also be configured to function as, for example, a multi-function display used to display navigation maps, weather radar, electronic charts, TCAS traffic, aircraft maintenance data and electronic checklists, manuals, and procedures. One or more flight displays 20 may also be configured to function as, for example, an engine indicating and crew-alerting system (EICAS) display used to display critical engine and system status data. Other types and functions of flight displays 20 are contemplated as well. According to various exemplary embodiments, at least one of flight displays 20 may be configured to provide a rendered display from the systems and methods of the present disclosure.

In some embodiments, flight displays 20 may provide an output from a ground-based system, such as a ground-based weather radar system. In some embodiments, flight displays 20 may provide an output from an aircraft-based system, such as an aircraft-based weather radar system, flight management system, traffic computer system, Inmarsat, Iridium services, communication management services, LIDAR system, infrared system or other system on the aircraft. For example, flight displays 20 may include a weather display, a joint display, a weather radar map, a traffic control display, and a terrain display. Further, flight displays 20 may include an electronic display or a synthetic vision system (SVS). For example, flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view, etc.). The views may include monochrome or color graphical representations of the terrain and/or weather information. Graphical representations of weather or terrain may include an indication of altitude of the weather or terrain or the altitude relative to the aircraft.

Aircraft control center 10 may include one or more user interface (UI) elements 22. UI elements 22 may include, for example, dials, switches, buttons, touch screens, keyboards, a mouse, joysticks, cursor control devices (CCDs) or other multi-function key pads certified for use with avionics systems, etc. UI elements 22 may be configured to, for example, allow an aircraft crew member to interact with various avionics applications and perform functions such as data entry, manipulation of navigation maps, and moving among and selecting checklist items. For example, UI elements 22 may be used to adjust features of flight displays 20, such as contrast, brightness, width, and length. UI elements 22 may also (or alternatively) be used by an occupant to interface with or change the displays of flight displays 20. UI elements 22 may additionally be used to acknowledge or dismiss an indicator provided by flight displays 20. Further, UI elements 22 may be used to correct errors on the electronic display. Other UI elements 22, such as indicator lights, displays, display elements, and audio alerting devices, may be configured to warn of potentially threatening conditions such as severe weather, terrain, obstacles, potential collisions with aircraft, etc.

Figure 1B:
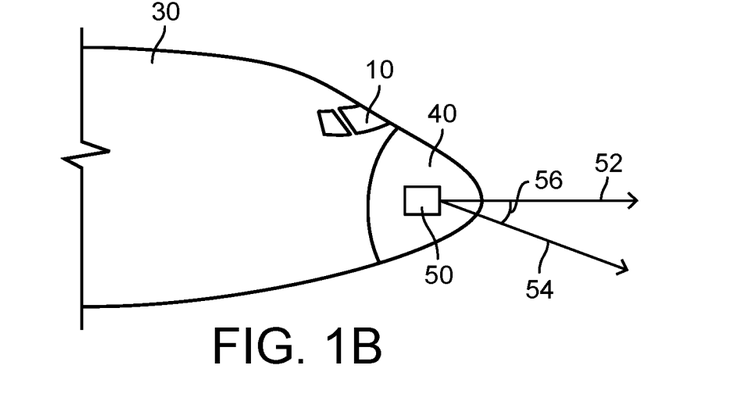
FIG. 1B is a side-view schematic illustration of the front of an exemplary aircraft with an aircraft control center and nose including a weather radar system for an exemplary decision support guidance system.

Referring to FIG. 1B, a side-view schematic illustration of an exemplary aircraft 30 with aircraft control center 10 and a nose 40 including a weather radar system for an exemplary decision support guidance system is shown. In the illustrated embodiment, a radar system 50, such as a weather radar system or other radar system, is generally located inside nose 40 of aircraft 30 or inside a cockpit of aircraft 30. According to other exemplary embodiments, radar system 50 may be located anywhere on aircraft 30, such as on the top of aircraft 30, on the tail of aircraft 30, or on either or both sides of aircraft 30. Furthermore, the various components of radar system 50 may be distributed at multiple locations throughout aircraft 30. Additionally, radar system 50 may include or be coupled to an antenna system of aircraft 30. Radar system 50 or other equipment aboard aircraft 30 may also be configured to receive weather data from other sources, for example, from ground-based weather radar systems. Radar system 50 may be any radar system configured to detect or receive data for the systems and methods of the present disclosure. According to exemplary embodiments, radar system 50 may be an RTA-4218 MULTISCAN radar system, a WXR-2100 MULTISCAN radar system, or similar system manufactured by Rockwell Collins and configured in accordance with the principles described herein.

Radar system 50 may generally work by sweeping a radar beam horizontally back and forth across the sky. For example, radar system 50 may conduct a first horizontal sweep 52 directly in front of the aircraft and a second horizontal sweep 54 downward at a tilt angle 56 (e.g., 20 degrees down). Returns from different tilt angles may be electronically merged to form a composite image for display on an electronic display, such as a flight display 20 in aircraft control center 10. Returns may also be processed to, for example, distinguish among terrain, weather, and other objects, to determine the height of the terrain, to determine the height of the weather, etc.

Radar system 50 may also sweep a radar beam vertically back and forth. Results from the different vertical tilt angles may be analyzed to determine the characteristics of weather. For example, the altitude, range, and vertical height of weather may be determined using the vertical scan results. These results may be used to form an image for display on an electronic display (e.g., flight display 20, etc.). For example, a vertical profile view of the weather may be generated. The profile may be used by a pilot to determine height, range, hazards and threats, and other relevant information that may be utilized by an aircraft crew member to change the course of the aircraft to avoid the detected weather condition, to make a determination to hold at a current airport for landing or to divert to an alternate airport or landing area, etc.

Figure 2:
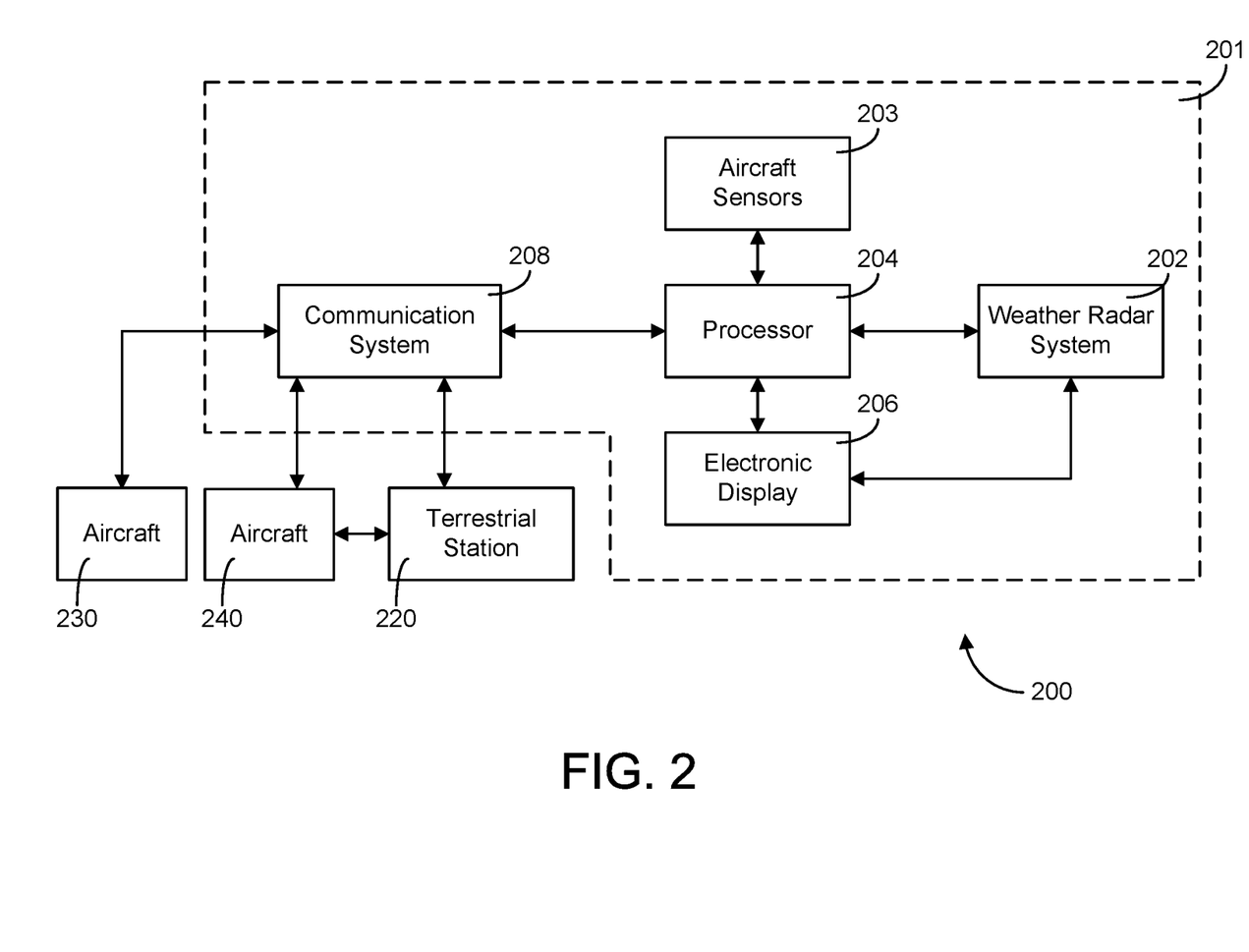
FIG. 2 is a block diagram of an exemplary decision support guidance display system including the exemplary weather radar system of FIG. 1B.

Referring to FIG. 2, a block diagram of an exemplary decision support guidance display system 200 including the exemplary weather radar system of FIG. 1B, that may be used, for example, on an aircraft 201 or other vehicle is shown. System 200 may include a weather radar system 202 (e.g., a system similar to radar system 50), aircraft sensors 203, electronics (such as a processor 204), an electronic display system 206 (e.g., a display similar to flight display 20, etc.), and a communication system 208. The communication system 208 may be configured to communicate with other aircraft 230, 240 and a terrestrial station 220. It will be appreciated that the communication system 208 may be configured to communicate with additional aircraft and additional terrestrial stations. Weather radar system 202 is generally configured to cast one or more radar beams from an aircraft mounted antenna, to receive returns, and to interpret the returns (e.g. for display to a user, for transmission to an external weather system, etc.). In some embodiments, weather radar system 202 is configured to receive weather data from ground-based radar systems.

Additionally, weather radar system 202 may perform multiple radar sweeps. The radar sweeps may include horizontal sweeps, vertical sweeps, or a combination of horizontal and vertical sweeps. Furthermore, the radar sweeps can be performed such that they are substantially orthogonal to one another. According to other exemplary embodiments, weather radar system 202 can be a monopulse radar system, a sequential lobing system, or a radar system with an aperture capable of switching modes. Aircraft sensors 203 may include, for example, one or more fuel sensors, airspeed sensors, location tracking sensors (e.g., GPS, etc.), lightning sensors, turbulence sensors, pressure sensors, optical systems (e.g., camera system, infrared system), outside air temperature sensors, winds at altitude sensors, INS G load (in-situ turbulence) sensors, barometric pressure sensors, humidity sensors, or any other aircraft sensors or sensing systems that may be used to monitor the performance of an aircraft or weather local to or remote from the aircraft. Data from aircraft sensors 203 may be output to processor 204 for further processing and display, or for transmission to a terrestrial station 220 (e.g., a ground-based weather radar system, air traffic control services system, or other terrestrial station) or to other aircraft 230, 240 via communication system 208. Data collected from ground-based systems, for example, terrestrial station 220 may also be processed by processor 204 to configure the collected data for display.

Weather radar system 202 may be a system for detecting weather patterns. Detected weather patterns may be communicated to electronic display system 206 for display to the flight crew. In addition, data from station 220 may be displayed on display system 206. Detected weather patterns may instead or may also be provided to electronics or processor 204 for further analysis or transmission to a station 220 or another aircraft 230, 240 via communication system 208.

Figure 3:
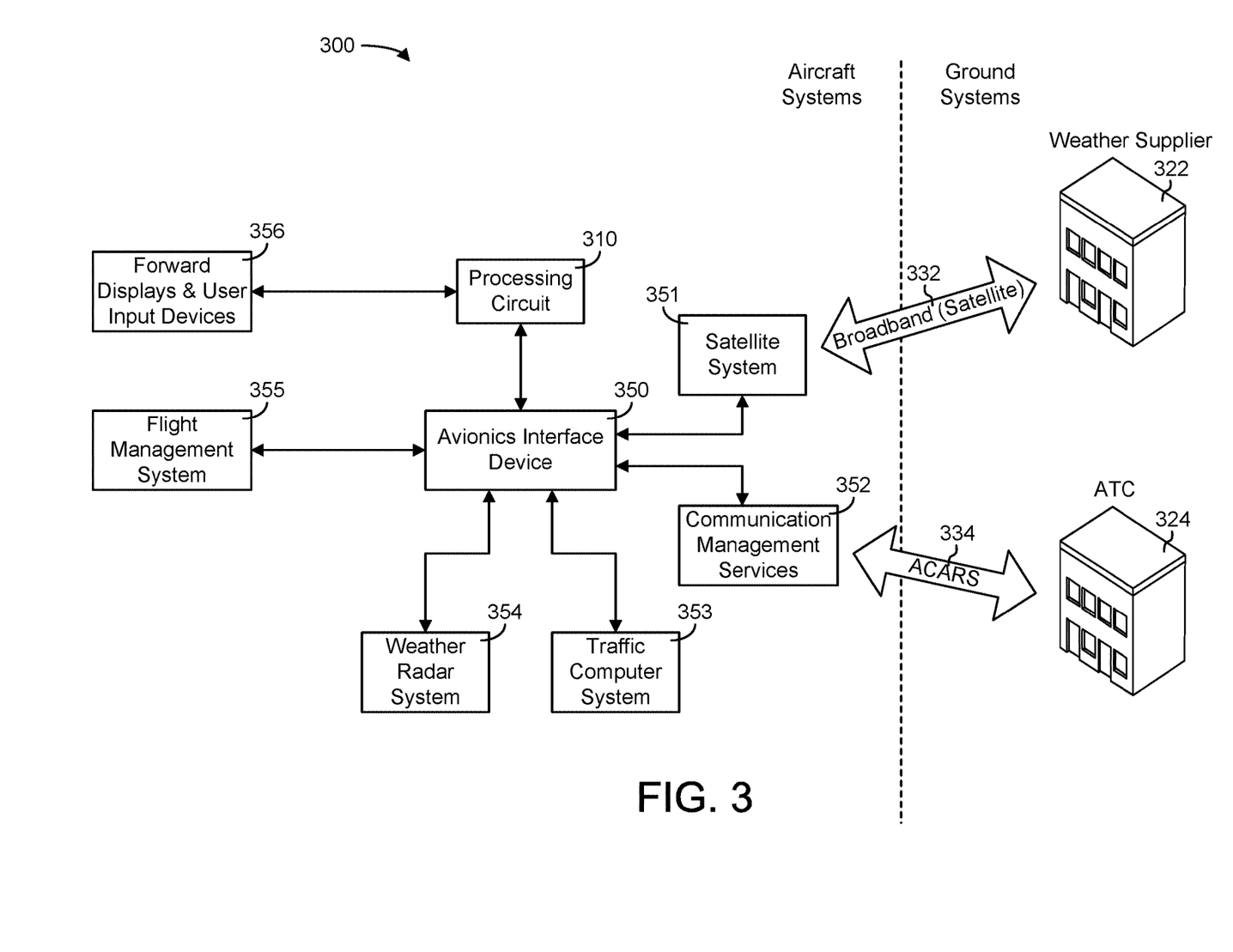
FIG. 3 is a more detailed block diagram of a decision support guidance system, according to an exemplary embodiment.

Referring to FIG. 3, a more detailed block diagram of a decision support guidance system 300 is shown, according to an exemplary embodiment. System 300 may include aircraft-based systems, ground-based systems, or both aircraft-based systems and ground-based systems. Ground-based systems may include, but are not limited to, a variety of systems, such as weather supplier system 322 or air traffic control system 324 (otherwise referred to as "ATC services 324"). Ground-based systems may also include terrestrial station 220. Aircraft-based systems may include, but are not limited to, processing circuit 310, avionics interface device 350, satellite system 351 (e.g., Inmarsat, Iridium services, etc.), communications management service 352, traffic computer system 353, weather radar system 354, flight management system 355, as well as forward displays and user input device 356. In some embodiments, forward displays and user input devices 356 may include flight displays 20 and user interface elements 22 and may be installed or located in aircraft control center 10.

Avionics interface device 350 may be a network interface configured to send data to, receive data from, or otherwise facilitate electronic data communications with the aircraft-based systems or the ground-based systems, including weather supplier system 322 (e.g., via satellite system 351), air traffic control system 324 (via communication management services 352), processing circuit 310, traffic computer system 353, weather radar system 354, or flight management system 355. Avionics interface device 350 may include wired or wireless interfaces (e.g., jacks, antennas, transmitters, receivers, transceivers, wire terminals, etc.) for conducting data communications with various systems, devices, or networks. For example, avionics interface device 350 may include an Ethernet card and port for sending and receiving data via an Ethernet-based communications network and/or a WiFi transceiver for communicating via a wireless communications network. In some embodiments, avionics interface device 350 may be configured to communicate via local area networks or wide area networks and may use a variety of communications protocols. In some embodiments, avionics interface device 350 may include components of the ground-based systems or components of the aircraft-based systems. For example, in some embodiments, avionics interface device 350 may include processing circuit 310.

Processing circuit 310 may include a processor and memory. The processor may be a general purpose or specific purpose processor, an application specific integrated circuit (ASIC), one or more field programmable gate arrays (FPGAs), a group of processing components, or other suitable processing components. The processor may be configured to execute computer code or instructions stored in memory or received from other computer readable media (e.g., CDROM, network storage, a remote server, etc.). Processing circuit 310 may be the same as, similar to, or different from processor 204.

The memory may include one or more devices (e.g., memory units, memory devices, storage devices, etc.) for storing data and/or computer code for completing and/or facilitating the various processes described in the present disclosure. The memory may include random access memory (RAM), read-only memory (ROM), hard drive storage, temporary storage, non-volatile memory, flash memory, optical memory, or any other suitable memory for storing software objects and/or computer instructions. The memory may include database components, object code components, script components, or any other type of information structure for supporting the various activities and information structures described in the present disclosure. The memory may be communicably connected to the processor via processing circuit 310 and may include computer code for executing (e.g., by the processor) one or more processes described herein.

In some embodiments, the aircraft-based systems may communicate with the ground-based systems using, for example, satellite system 351, communication management services 352, or other wireless communication system. System 300 may utilize various types of channels to communicate, including virtual channels, radio channels, satellite channels, etc. The channels may be bi-directional or unidirectional. Channels may be satellite link channels, VHF channels, INMARSAT channels, etc. Any type of wireless communications may be utilized. Various types of communication protocols, including network and ad hoc network protocols may be used to perform communication operations and establish channels to facilitate communications. In some embodiments, aircraft-based systems may communicate with ground-based systems through short-range wireless communication systems or wired interfaces (e.g., when aircraft 30 is parked at a terminal or otherwise grounded).

In some embodiments, communication management services 352 and satellite system 351 may communicate with aircraft-based systems of other aircraft or other vehicle-based systems (e.g., mobile radar stations, etc.). For example, communication management services 352 and satellite system 351 may facilitate communications among another aircraft, or multiple other aircrafts, having their own guidance systems or other communications systems. Decision support guidance system 300 may receive weather data, air traffic data, or other data from other aircraft. System 300 may communicate with and receive and utilize data from any number of additional aircraft or ground-based systems.

Weather supplier system 322 may be the same as or substantially similar to weather radar system 202 or terrestrial station 220. Weather supplier system 322 may be configured to provide avionics interface device 350 with weather information. Weather information provided by aircraft weather radar systems may be used in conjunction with weather information from other aircraft or ground-based systems to, for example, improve range and accuracy and to reduce gaps in radar coverage. For example, the National Weather Service WSR-88D Next Generation Radar (NEXRAD) weather radar system is conventionally used for detection and warning of severe weather conditions in the United States. NEXRAD data is typically more complete than data from aircraft-based weather radar systems due to its use of volume scans of up to 14 different elevation angles with a one degree beam width. Similarly, the National Lightning Detection Network (NLDN) may typically be a reliable source of information for weather conditions exhibiting intense convection. Weather satellite systems, such as the Geostationary Operational Environmental Satellite system (GOES) and Polar Operational Environmental Satellite system (POES) are also primary sources of data used for weather analyses and forecasts.

Weather radar signals are processed to provide graphical images to a radar display. The radar display is typically a color display providing graphical images in color to represent the severity of the weather. Some aircraft systems also include other hazard warning systems such as a turbulence detection system. The turbulence detection system can provide indications of the presence of turbulence or other hazards. Conventional weather display systems are configured to display weather data in two dimensions and often operate according to ARINC 453 and 708 standards. A horizontal plan view provides an overview of weather patterns that may affect an aircraft mapped onto a horizontal plane. Generally the horizontal plan view provides images of weather conditions in the vicinity of the aircraft, such as indications of precipitation rates. Red, yellow, and green colors are typically used to symbolize areas of respective precipitation rates, and black color symbolizes areas of very little or no precipitation. Each color is associated with radar reflectivity range which corresponds to a respective precipitation rate range. Red indicates the highest rates of precipitation while green represents the lowest (non-zero) rates of precipitation. Certain displays may also utilize a magenta color to indicate regions of turbulence.

Figure 4A:
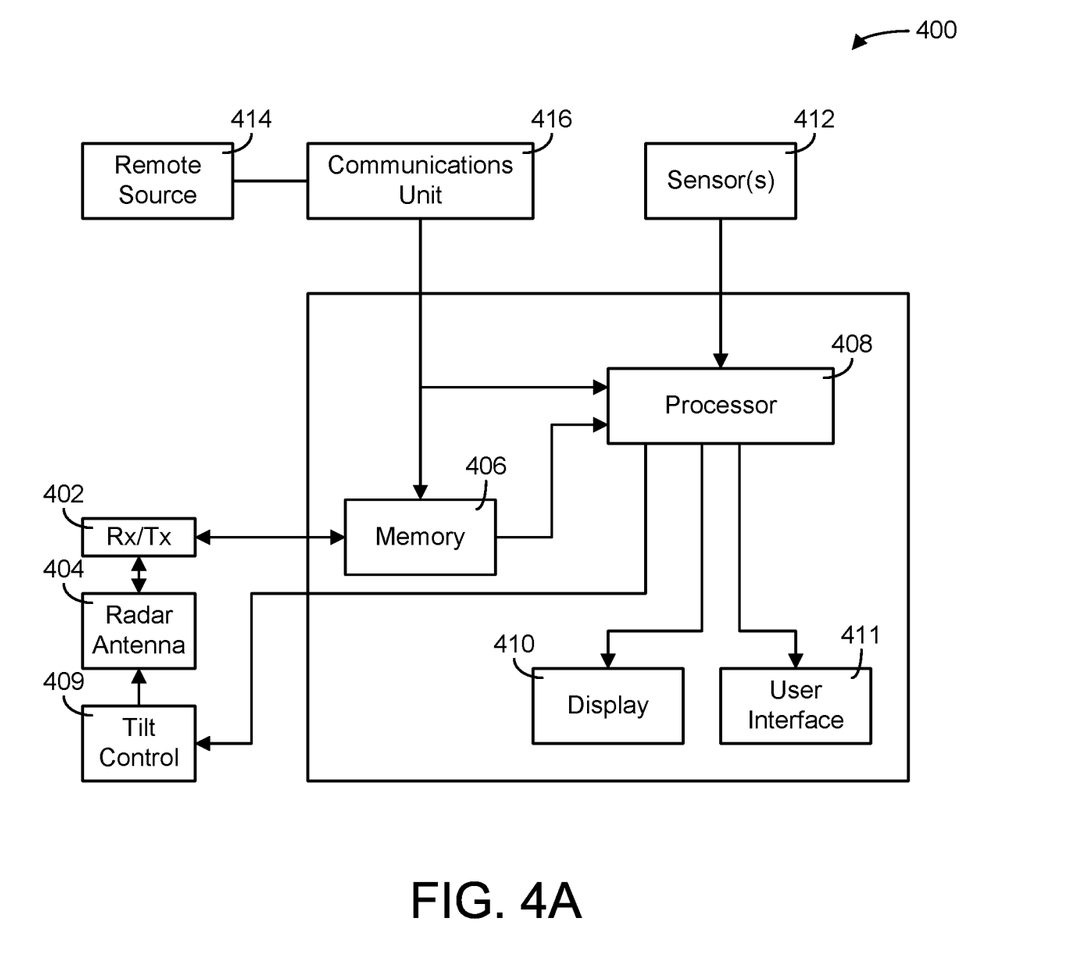
FIG. 4A is a block diagram of an exemplary weather radar system for an exemplary decision support guidance system.

Referring to FIG. 4A, a block diagram of an exemplary weather radar system 400 is shown for an exemplary decision support guidance system. In some embodiments, weather radar system 400 may be the same as or substantially similar to weather radar system 354 of system 300. System 400 may include a weather radar receiver/transmitter 402, weather radar adjustable antenna 404, a memory 406 (e.g., a multi-scan, multi-tilt angle memory), a processor 408 and a system bus that couples various system components including memory 406 to processor 408. System 400 may also include a tilt control 409 for automatically controlling the tilt angle (mechanical or electronic) of antenna 404. In some embodiments, this auto control may include an additional manual control feature as well. System 400 may also be in communication with one or more displays 410 (e.g., a display similar to display 20 shown in FIG. 1), one or more UI elements 411 (e.g., similar to UI elements 22 shown in FIG. 1) and one or more sensors 412, and also in communication with one or more remote data sources 414 (e.g., another aircraft or a ground station) via a communications unit 416 (e.g., radio or other wireless communication device).

Figure 4B:
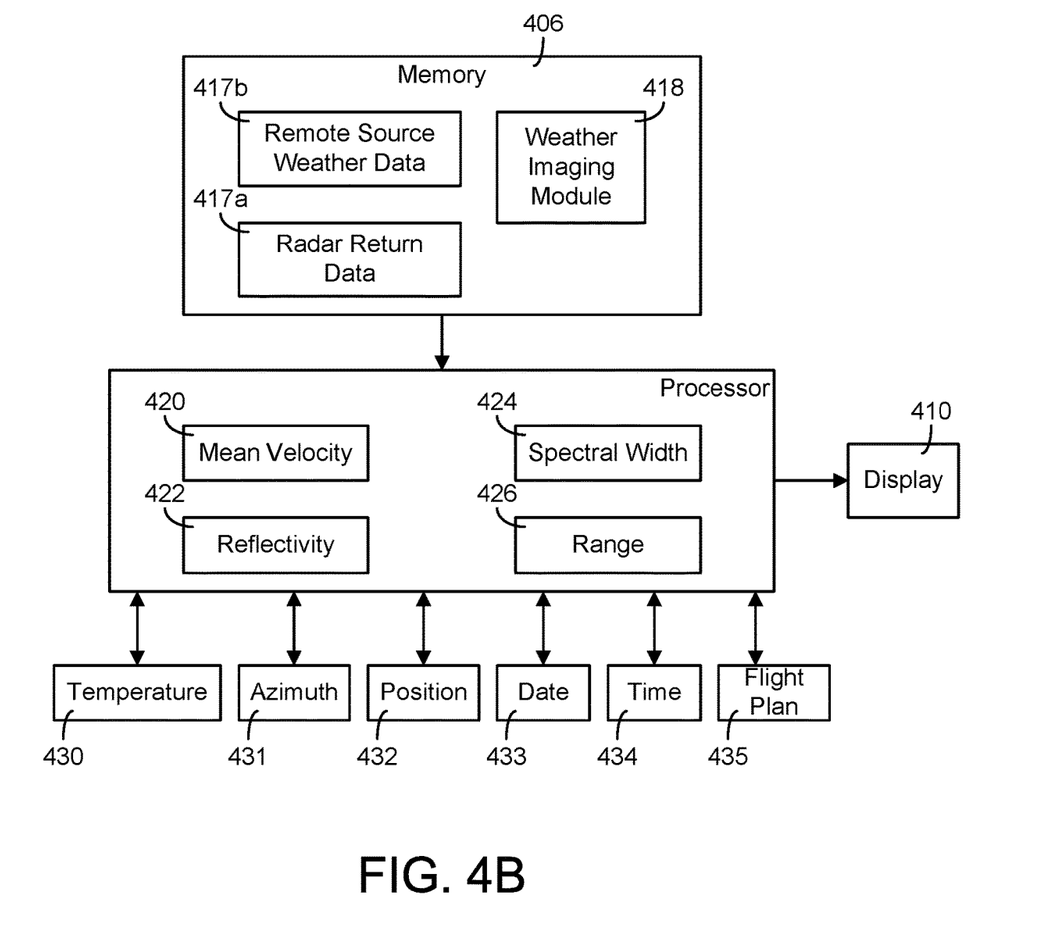
FIG. 4B is a data flow diagram of an exemplary weather radar system for an exemplary decision support guidance system.

Memory 406 may include any type of machine-readable storage device capable of storing radar returns or associated weather data 417 (shown in FIG. 4B) or program instructions for analysis/processing by processor 408, such as weather image application 418 (shown in FIG. 4B). Memory 406 may be, for example, a non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise random access memory (RAM), read only memory (ROM), erasable programmable read only memory (EPROM), electrically erasable programmable memory (EEPROM), CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine. System 400 may have one or more memories 406 that use the same or a different memory technology. Memory 406 may store weather data 417 and weather image application 418 in addition to other instructions or data.

In some embodiments, memory 406 may be capable of storing in a readily addressable and rapidly retrievable manner at least two sets of weather data 417 resulting from two or more antenna sweeps at different angles, although a single scan of data may also be used in some embodiments. Memory 406 may also include a three-dimensional storage buffer for storing weather radar parameters according to X, Y and Z coordinates according to one embodiment. The storage of radar data and the form of the weather data 417 stored therein is not disclosed in a limiting fashion. A variety of techniques for storing weather data 417 may be used as well.

Processor 408 may be implemented in hardware, firmware, software, or any combination of these methods. System 400 may have one or more processors 408 that use the same or a different processing technology. Additionally, processor 408 may be a separate component of system 400 or may be embedded within another component of system 400. Processor 408 may execute instructions that may be written using one or more programming languages, scripting languages, assembly languages, etc. The instructions may be carried out by, for example, a special purpose computer, logic circuits, or hardware circuits. The term "execute" is the process of running an application or the carrying out of the operation called for by an instruction. Processor 408 may process data and/or execute applications stored in memory 406, such as weather data 417 and weather image application 418 and/or other instructions.

Referring now to FIG. 4B, a data flow diagram of exemplary weather radar system 400 for an exemplary decision support guidance system is shown. As shown in FIG. 4B, processor 408 may provide a velocity parameter 420, such as a mean velocity parameter and a spectral width parameter 424 (e.g., derived from weather radar returns or from weather data from a remote source for individual or grouped weather cells). Alternatively, other types of velocity parameters can be utilized. In addition, processor 408 may provide a reflectivity parameter 424 and a range parameter 426. Range parameter 426 along with scan angle position may be used to plot the location of a weather condition on display 410. Processor 408 may also receive a temperature parameter 430, an azimuth 431, a location 432, a date 433, a time 434, and a flight plan 435 from another source, such as an external sensor or system. In some embodiments, parameters 430, 431, 432, 433, 434 and 435 may be computed by processor 408 using data stored in memory 406, such as radar return data 417a or remote source data 417b.

Referring back to FIG. 3, air traffic control system 324 may be configured to communicate with avionics interface device 350 via communication management services 352. In some embodiments, air traffic control system 324 may communicate with communication management services 352 through the ACARS network. In some embodiments, communication management services 352 may enable two-way communication between decision support guidance system 300 and all services available on the ACARS network, including PreDeparture Clearance ("PDC"), Digital Airport Terminal Information Services ("D-ATIS"), weather products and a host of messaging destinations including email, SMS, group messaging, fax and aviation ground networking addresses (e.g., Aeronautical Fixed Telecommunications Network "AFTN" and ARINC Data Network Service "ADNS"), among others.

Processing circuit 310 of the decision support guidance system 300 may be configured to provide display data (e.g., via forward displays and user input devices 356) based on data received from components of system 300, for example, to provide information to a pilot that supports a decision (e.g., to either hold course or divert to an alternate airport). Processing circuit 310 may provide display data based on data received from satellite system 351, communication management services 352, traffic computer system 353, weather radar system 354, and flight management system 355, among other components not shown or described in FIG. 3. The display data may further be based on a number of determinations made by processing circuit 310 based on the received data. In some embodiments, processing circuit 310 may be ground-based and avionics interface 350 may receive data from processing circuit 310 over one or more communication channels via a communications interface, such as communication management services 352.

In some embodiments, processing circuit 310 receives airport information for a plurality of airports. The airport information may include a location of each airport of the plurality of airports, operational constraints (e.g., whether the airport operates under instrument flight rule or visual flight rule protocols), and other information related to an airport. In some embodiments, processing circuit 310 receives weather information. The weather information may include a weather forecast at each airport within a flight range, a weather forecast along a determined route to each airport within a flight range, and so on. In some embodiments, processing circuit 310 receives instructions to enter a holding pattern. For example, instructions to enter a holding pattern may be received from ATC services 324. In some embodiments, processing circuit 310 receives a holding pattern from a database server. In some embodiments, processing circuit 310 receives a selection of a primary airport and a secondary airport from among the plurality of airports (e.g., via forward displays and user input device 356). Processing circuit 310 may be configured to receive instructions to divert to an alternate airport (e.g., from ATC services 324 via communication management services 352). In some embodiments, processing circuit 310 dynamically receives data in real-time, however, data may also be received based on periodic intervals (e.g., every minute, twice a minute, etc.).

The display data provided by processing circuit 310 may be based on a number of determinations. In some embodiments, processing circuit 310 is configured to determine a flight range of an ownship based on a location of the ownship and an amount of fuel remaining in the ownship, and to determine if any of the plurality of airports are within the flight range of the ownship. In some embodiments, processing circuit 310 is configured to determine, for each airport within the flight range of the ownship, an amount of time the ownship can maintain a current flight course before the airport is no longer within the flight range, a route to each airport of the plurality of airports, if the airport can be reached by the ownship based on received weather information, and so on. In some embodiments, determining if any of the plurality of airports are within the flight range of the ownship is further based on a determined route to each airport. In some embodiments, processing circuit 310 is configured to determine an airspeed of an ownship that will produce the maximum range of the ownship. In some embodiments, processing circuit 310 may be configured to determine an airspeed of an ownship that will produce the maximum endurance of the ownship.

In some embodiments, processing circuit 310 may be configured to provide display data, for example, via forward displays and user input devices 356. The display data may indicate a location of an airport within the flight range of the ownship and the amount of time the ownship can maintain the current flight course before the airport is no longer within the flight range. In some embodiments, the display data may include, for each airport within the flight range of the ownship, an identification of each airport, a distance to each airport, an amount of fuel needed to reach each airport, an amount of flight time needed to reach each airport, an amount of fuel needed to maintain the current flight course, an amount of flight time needed to maintain the current flight course, etc. In some embodiments, the display data may indicate operational constraints for each airport within the flight range. For example, the operational constraints may indicate whether an airport operates under instrument flight rule or visual flight rule protocols. It will be appreciated that information may be displayed in various formats. For example, in some embodiments, graphical depictions of airport locations and information may be displayed, In addition to providing display data, processing circuit 310 may be configured to further provide an audio warning or other visual indicator. For example, an audio warning, such as a siren or spoken warning may be provided based on the amount of time the ownship can maintain the current flight course before a secondary airport is no longer within the flight range.

A pilot or aircraft crew member may ultimately determine to hold or divert to an alternate airport based on the data provided by decision guidance system 300. Accordingly, decision guidance system 300 provides pilots with information needed to make the most efficient and safest decision based on current data (e.g., via forward displays and input devices 356, etc.). Decision guidance system 300 may provide pilots and aircraft crew with information in real-time because, for example, the best option for the ownship may change over time as fuel is consumed and as weather conditions change at the intended destination airport or possible alternate airports.

For example, in one embodiment, upon receiving a Hold and Expect Further Clearance order issued by ATC services, processing circuit 310 of decision support guidance system 300 determines all alternate airports that are within the range of the ownship, how much fuel is required to reach each alternate airport, and how long the ownship can hold at the instructed location before each alternate airport becomes unreachable due to a lack of fuel. Next, processing circuit 310 creates a display that shows all possible alternate airports, how much fuel and flight time is need to reach each alternate airport, and how much fuel and flight time are available for holding. Next, processing circuit 310 updates the display as time goes forward and, for each alternate airport, counts down until the alternate airports are no longer viable options (e.g., due to lack of fuel remaining, changed conditions such as weather or air traffic, etc.). Based on the displayed data, the flight crew may elect to divert to a selected alternate airport, in which case processing circuit 310 updates the flight plan with ATC services and loads the updated flight plan into flight management system 355 (e.g., for guidance to the selected alternate airport, etc.). It will be appreciated by one skilled in the art that this is one example of an implementation of decision support guidance system 300 and that many alternate implementations are also possible.

In another example, according to one embodiment, upon receiving a Hold and Expect Further Clearance order issued by ATC services via a data communications channel, processing circuit 310 retrieves an active flight plan from flight management system 355. Next, processing circuit 310 determines whether the holding pattern was included as part of the Hold and Expect Further Clearance communication, and if not, a holding pattern for the intended destination airport is retrieved from a published procedures database server. Next, processing circuit 310 requests updated weather information for the destination airport and the region surrounding the destination airport (e.g., from weather supplier system 322 or other weather information service via a data communications channel). Next, processing circuit 310 retrieves local weather information from an onboard weather radar system (e.g., weather radar system 354), local traffic information from an onboard traffic system (e.g., traffic computer system 353), a current fuel load of the ownship (e.g., from an avionics system), aircraft performance information (e.g., from onboard sensors or from a database), etc. Based on the received information, processing circuit 310 may be configured to determine an optimum airspeed, for example, based on the fuel remaining onboard the aircraft. It will be appreciated that, in some embodiments, the optimum airspeed determined by processing circuit 310 may be further based on whether the ownship is currently in or will enter a hold pattern or based on whether the ownship is diverting to an alternate airport. For example, if the ownship enters a hold pattern, the optimum airspeed may be determined to provide maximum endurance of the ownship (e.g., based on minimum fuel use such that the time the ownship is able to remain aloft is maximized). In another example, if the ownship diverts to an alternate airport, the optimum airspeed may be determined to provide maximum range of the ownship (i.e., based on a level of fuel use that provides the ownship with the ability to travel the greatest distance). In some embodiments, processing circuit 310 may be configured to request optimum airspeed information from, for example, a database or flight management system 355. Next, processing circuit 310 identifies all possible alternate airports within range of the ownship (e.g., using a charts or map database server). Next, for each possible alternate airport, processing circuit 310 retrieves all published approaches to the alternate airport (e.g., from a published procedures database server); determines a most desirable approach procedure based on current ownship capabilities and the direction from which the ownship will arrive at the airport; calculates a general route from the current position of the ownship to an Initial Approach Fix (e.g., where the initial approach segment of an instrument approach begins, hereinafter "IAF") of the selected approach procedure; retrieves terrain and obstacle information along the general route to the IAF; calculates a most efficient and hazard-free route (e.g., safest route) to the IAF from the current holding procedure; calculates fuel requirements to fly to the alternate airport, conduct the approach and rollout while maintaining sufficient reserves to hold at the alternate airport; and calculates how much fuel can be used to hold at the intended destination airport given the fuel requirements to fly to, hold at, and land at the alternate airport. Processing circuit 310 may also be configured to cause a matrix of information to be displayed to the flight crew that includes, for example, a name or identification of each alternate airport; distance, fuel, and flight time to each alternate airport; and fuel and flight time that can be used to hold at the intended destination if the crew subsequently chooses to divert to each alternate airport. Processing circuit 310 may additionally be configured to update the matrix of information on a periodic basis. In some embodiments, the period of time is selectable or otherwise configurable by flight crew. Next, based on the flight crew electing to divert to one of the alternate airports, processing circuit 310 sends an updated flight plan to ATC services via a data communications link (e.g., communication management services 352). Based on ATC accepting the new flight plan, processing circuit 310 loads the new flight plan into the flight management system 355 and displays the new flight plan to the flight crew. In some embodiments, the flight crew may activate the new flight plan using flight management system 355. Although the preceding example presents specific steps in a specific order, it will be appreciated by one skilled in the art that this is one example of an implementation of decision support guidance system 300 and that many alternate implementations are also possible that include additional steps, fewer steps, and/or a different order of steps.

Figure 5:
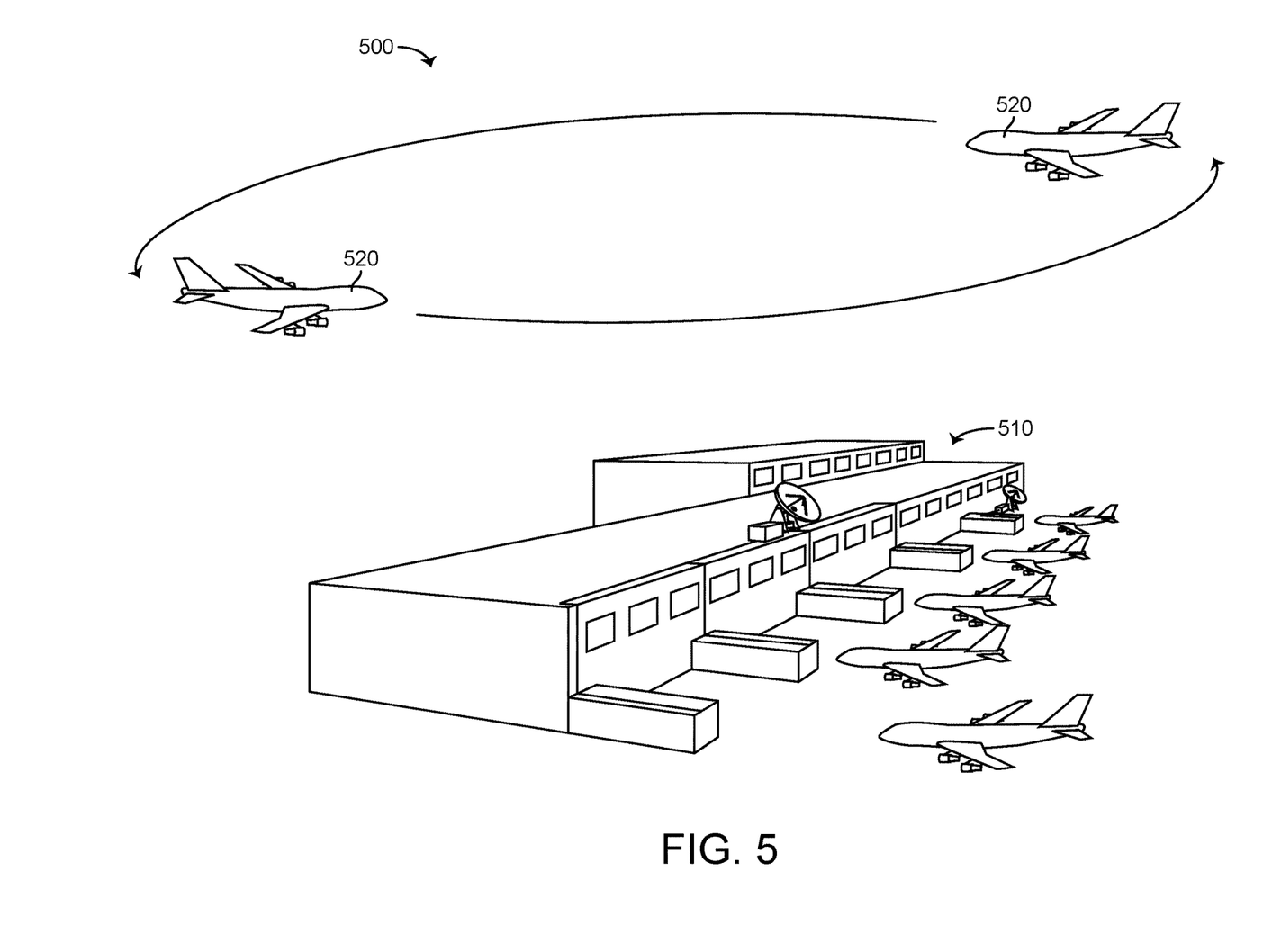
FIG. 5 is an illustration of a hold pattern near an intended airport, according to an exemplary embodiment.

Referring to FIG. 5, an illustration of a hold pattern 500 near an intended airport 510 is shown, according to an exemplary embodiment. Upon arriving at intended airport 510 (or en route thereto), ATC services may issue a Hold and Expect Further Clearance order, or other instruction to enter a holding pattern, to aircraft 520. Upon receiving the order, aircraft 520 may enter a hold pattern 500. Although hold pattern 500 is typically a circular or oval pattern that requires turning in the same direction (e.g., always right turns or always left turns), hold pattern 500 may be any type of pattern that aircraft 520 and other aircraft can follow to avoid collisions. Hold pattern 500 may include a fixed entry point, a fixed exit point, and predetermined approach routes for entering hold pattern 500. Hold pattern 500 may be a standard hold pattern that is published by intended airport 510, or may be a standard hold pattern based on a location of hold pattern 500. In some embodiments, decision support guidance system 300 receives hold pattern instructions from intended airport 510, from ground-based systems (e.g., such as air ATC services 324), from an on-board database, etc.

Figure 6:
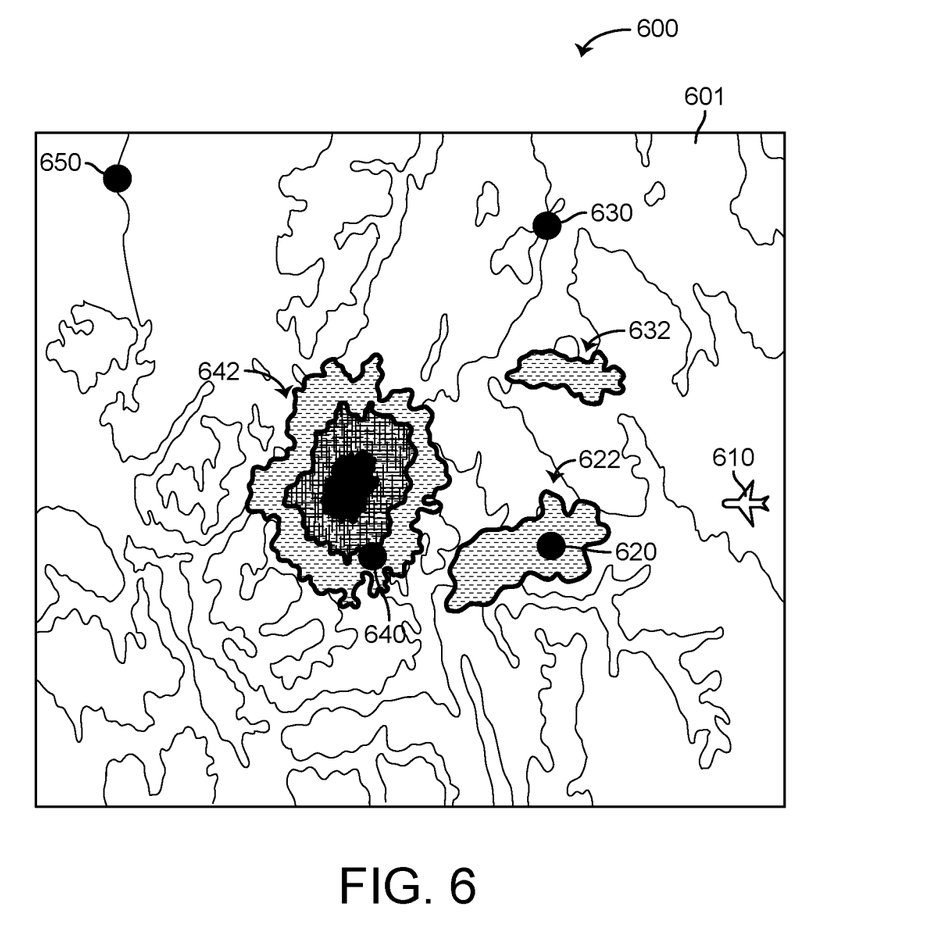
FIG. 6 is an illustration of a display screen for a decision support guidance system, according to an exemplary embodiment.

Referring to FIG. 6, an illustration of a display screen 601 for a decision support guidance system 600 is shown, according to an exemplary embodiment. In one embodiment, the display screen 601 includes a customizable display area for displaying aviation events, terrain data, weather data, etc. As described in detail above, the decision support guidance system 600 may retrieve data from various data sources, such as processing circuit 310, processor 204, and/or processor 408. Aircraft crew may interact with display screen 601 by using UI elements 22 in cockpit 10 or through a touch-screen interface included on display screen 601, which may be any one or more of display screens 20. In one embodiment, characteristics of display screen 601 may be selectively customized by a user, such as the width, length, location and orientation of a display area on display screen 601. It will be appreciated that FIG. 6 is only one non-limiting exemplary embodiment of display screen 601 and that information may be displayed on display screen 601 in many forms, including but not limited to text only information, graphical depictions, 3-D illustrations, plan views, horizontal views, vertical views, and so on.

In some embodiments, a plurality of indicators may be displayed on the display screen 601, including a location of ownship 610, a location of an intended airport 620, and locations of alternate airports 630, 640, 650. The indicators may also include aviation events, such as weather event 622, 632, 642. In one embodiment, the display screen 601 may be automatically updated, via processing circuit 310, based on a predetermined time interval. For example, system 600 may be configured to update the display screen every five minutes, one minute, thirty seconds, etc. In one embodiment, the display screen 601 is updated based on weather data received by processing circuit 310. For example, in one embodiment, upon weather radar system 354 or weather supplier system 322 detecting a thunderstorm formation (e.g., weather event 622), the display screen 601 is automatically updated. The processing circuit 310 may also be configured to update display screen 601 based on other criteria as well, including radio transmissions, weather advisory warnings, and information received from SIGMETs, or AIRMETs, among others.

Figure 7:
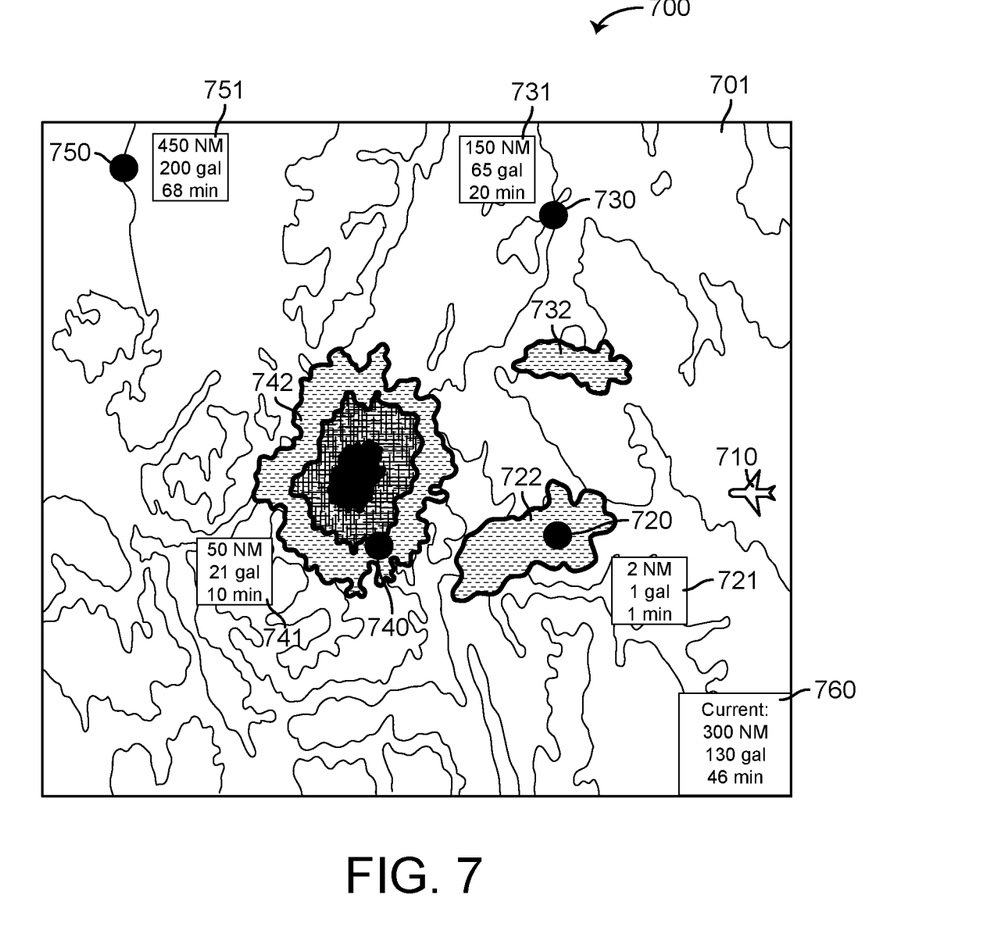
FIG. 7 is an illustration of a display screen for a decision support guidance system, according to another embodiment.

Referring now to FIG. 7, an illustration of a display screen 701 for a decision support guidance system 700 is shown, according to another embodiment. Display screen 701 may be the same as or substantially similar to display screen 601 or any one of display screens 20 described above. In some embodiments, display screen 701 may be configured to display a plurality of indicators, including a location of ownship 710, a location of an intended airport 720, and a location of alternate airports 730, 740, 750. The indicators may also include aviation events, such as weather event 722, 732, 742. Display screen 701 may also be configured to display, via processing circuit 310, airport information displays 721, 731, 741, 751, and ownship performance display 760. In some embodiments, information displays 721, 731, 741, 751 may be configured to display information relating to alternate airports 730, 740, 750. For example, in one embodiment, information displays 721, 731, 741, 751 may include a distance to each airport (e.g., 2 nautical miles, 50 nautical miles, 150 nautical miles, 450 nautical miles, etc.), fuel needed to reach each airport (e.g., 1 gallon, 21 gallons, 65 gallons, 200 gallons, etc.), and a flight time required to reach each airport (e.g., 1 minute, 10 minutes, 20 minutes, 68 minutes, etc.). In some embodiments, ownship performance display 760 may be configured to display information relating to the performance or capabilities of ownship 710. For example, ownship performance display 760 may indicate the flight range (e.g., 300 nautical miles, etc.), the fuel load (e.g., 130 gallons, etc.), and flight time (e.g., 46 minutes, etc.) of ownship 710. However, it will be appreciated that the information displayed by ownship performance display 760 may include additional information or other information described above. For example, ownship performance display 760 may display information relating to how long ownship 710 can remain in a holding pattern at its current location and still reach an alternate airport (e.g., alternate airport 730) if a decision to divert is ultimately made. In some embodiments, display screen 701 may no longer provide information for or display an alternate airport if the alternate airport can no longer be reached by ownship 710. For example, in one embodiment, processing circuit 310 may cause display screen 701 to no longer display alternate airport 750 and information display 751 since, according to the range of the ownship provided in ownship performance display 760, alternate airport 750 is no longer reachable (e.g., as shown in FIG. 7, alternate airport 750 is 450 nautical miles away from ownship 710, which has a current range of 300 nautical miles). In some embodiments, other information may also be displayed by display screen 701, such as fuel and flight time that can be used to hold at the intended airport 720 if the crew subsequently chooses to divert to each alternate airport 720, 730, 740, 750, a name or identification of each alternate airport, a countdown timer indicating when ownship 710 must divert to each alternate airport (e.g., based on flight range, fuel supply, current weather conditions, forecasted weather conditions, etc.), and so on. It will be appreciated that FIG. 7 is only one non-limiting exemplary embodiment of display screen 701 and that information may be displayed on display screen 701 in many forms, including but not limited to text only information, graphical depictions, 3-D illustrations, plan views, horizontal views, vertical views, and so on. For example, in one embodiment, information may be displayed on display screen 601 or 701 in a tabular format that includes an identification of an airport, distance to the airport, flight time to the airport, fuel required to reach the airport, and a countdown timer that indicates how long the ownship can remain in a general location (or maintain a current flight course) before the airport becomes unreachable.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Further, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a computing device in the form of a computer, including a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts and diagrams provided herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method, comprising:
receiving, via an ownship in a holding pattern associated with a primary airport, airport information for a plurality of airports comprising the primary airport and at least one alternate airport, wherein the airport information includes a location of each airport of the plurality of airports;
determining a flight range of an ownship based on a location of the ownship and an amount of fuel remaining in the ownship;
determining if any alternate airport of the plurality of airports is within the flight range of the ownship; and
for each airport within the flight range of the ownship:
determining a most desirable approach procedure based on current ownship capabilities and a direction from which the ownship will arrive at the airport;

determining a route from the current position of the ownship to an initial approach fix of the approach procedure;
determining an amount of time the ownship can maintain a current flight course before the airport is no longer within the flight range of the ownship;
providing display data via a display, wherein the display data indicates the amount of time the ownship can maintain the current flight course before the airport is no longer within the flight range of the ownship;
and
updating the display data to decrease the indicated amount of time by redetermining the amount of time as time moves forward.

2. The method of claim 1, further comprising:
wherein determining if any airport of the plurality of airports is within the flight range of the ownship is further based on the route to each airport.

3. The method of claim 1, wherein determining the flight range of the ownship is further based on a determined airspeed of the ownship that will produce a maximum range of the ownship.

4. The method of claim 1, further comprising:
receiving weather information, wherein the weather information includes a weather forecast at each airport within the flight range;
and
determining, for each airport within the flight range, if the ownship can safely land at the airport based on the received weather information;
wherein
the display data further indicates if the ownship can safely land at the airport.

5. The method of claim 4, wherein the weather information further includes a weather forecast along a determined route to each airport within the flight range.

6. The method of claim 1, wherein the display data further includes:
an identification of each airport;
a distance to each airport;
an amount of fuel needed to reach each airport;
an amount of flight time needed to reach each airport; and
an amount of fuel available to maintain the current flight course.

7. The method of claim 1, further comprising receiving instructions to enter a holding pattern, wherein the display data further includes the instructions.

8. The method of claim 1, further comprising receiving operational constraints for each airport within the flight range, wherein the display data further includes the operational constraints.

9. The method of claim 8, wherein the operational constraints indicate whether the airport operates under instrument flight rule or visual flight rule protocols.

10. The method of claim 1, wherein the display data further comprises a graphical indication of the location of each airport within the flight range of the ownship.

11. A system for providing decision support guidance to an ownship in a holding pattern associated with a primary airport, comprising:
a display;
and
a processing circuit configured to:
receive airport information for a plurality of airports comprising the primary airport and at least one alternate airport, wherein the airport information includes a location of each airport of the plurality of airports;
determine a flight range of an ownship based on a location of the ownship and an amount of fuel remaining in the ownship;
determine if any alternate airport of the plurality of airports is within the flight range of the ownship;
and
for each airport within the flight range of the ownship:
determine an approach procedure based on current ownship capabilities and a direction from which the ownship will arrive at the airport;
determine a route from the current position of the ownship to an initial approach fix of the approach procedure;
determine an amount of time the ownship can maintain a current flight course before the airport is no longer within the flight range;
provide display data via the display, wherein the display data indicates the amount of time the ownship can maintain the current flight course before the airport is no longer within the flight range;
and
update the display data to decrease the indicated amount of time by redetermining the amount of time as time moves forward.

12. The system for providing decision support guidance of claim 11, wherein the is initial approach fix is where an instrument approach begins.

13. The system for providing decision support guidance of claim 11, wherein determining the flight range of the ownship is further based on a determined airspeed of the ownship that will produce a maximum range of the ownship.

14. The system for providing decision support guidance of claim 11, wherein the processing circuit is further configured to:
receive weather information, wherein the weather information includes a weather forecast at each airport within the flight range; and
determine, for each airport within the flight range, if the ownship can safely land at the airport based on the received weather information;
wherein the display data further indicates if the ownship can safely land at the airport.

15. The system for providing decision support guidance of claim 14, wherein the weather information further includes a weather forecast along a determined route to each airport within the flight range.

16. The system for providing decision support guidance of claim 11, wherein the display data further includes:
an identification of each airport;
a distance to each airport;
an amount of fuel needed to reach each airport;
an amount of flight time needed to reach each airport;
and
an amount of fuel available to maintain the current flight course.

17. A method of providing decision support guidance, comprising:
receiving ownship information, wherein the ownship information includes an ownship location, a current flight course, and an amount of fuel remaining in the ownship, wherein the current flight course comprises a holding pattern;

receiving airport information for a plurality of airports, wherein the plurality of airports include a primary airport and at least one alternate airport, and wherein the airport information includes a location of each airport of the plurality of airports;

determining an approach procedure based on current ownship capabilities and a direction from which the ownship will arrive at the airport;

determining a route from the current position of the ownship to an initial approach fix of the approach procedure;

determining a flight range of the ownship based on the amount of fuel remaining in the ownship;

determining if any airport of the plurality of airports is within the flight range of the ownship;

determining, for each airport within the flight range, an amount of time the ownship can maintain the current flight course before the airport is no longer within the flight range;

and providing, for each airport within the flight range, display data, wherein the display data indicates the amount of time the ownship can maintain the current flight course before the airport is no longer within the flight range.

18. The method of providing decision support guidance of claim 17, further comprising:

receiving weather information, wherein the weather information includes a weather forecast at each airport within the flight range;

and determining, for each airport within the flight range, if the ownship can safely land at the airport based on the received weather information;

wherein the display data further indicates if the ownship can safely land at the airport.

19. The method of providing decision support guidance of claim 17, wherein the display data further includes:

an identification of each airport;

a distance to each airport;

an amount of fuel needed to reach each airport;

an amount of flight time needed to reach each airport;

and an amount of fuel available to maintain the current flight course.

* * * * *